United States Patent [19]

Cohn

[11] Patent Number: 5,678,932
[45] Date of Patent: Oct. 21, 1997

[54] SPLIT BEARING

[75] Inventor: Alan R. Cohn, Lockeford, Calif.

[73] Assignee: Lift-U, Division of Hogan Mfg., Inc., Escalon, Calif.

[21] Appl. No.: 375,916

[22] Filed: Jan. 20, 1995

[51] Int. Cl.$^6$ .................................................. F16C 35/02
[52] U.S. Cl. .......................... 384/428; 384/275; 384/438
[58] Field of Search ............................. 384/276, 295, 384/296, 416, 428, 434, 435, 438, 441–444, 275

[56] References Cited

U.S. PATENT DOCUMENTS

| | | | |
|---|---|---|---|
| 23,377 | 3/1859 | Lee et al. | |
| 1,013,847 | 1/1912 | Salstrom . | |
| 1,666,972 | 4/1928 | Miller et al. | 384/438 |
| 3,106,991 | 10/1963 | Winge | 384/428 X |
| 3,366,356 | 1/1968 | Fisher | 248/56 |
| 3,451,705 | 6/1969 | Turpen | 384/192 X |
| 4,058,228 | 11/1977 | Hall | 214/77 R |
| 4,557,529 | 12/1985 | Cherry et al. | 384/295 |
| 4,620,805 | 11/1986 | Belanger | 384/276 X |
| 5,007,235 | 4/1991 | Nickel et al. | 384/438 X |
| 5,072,821 | 12/1991 | Kruse et al. | 198/327 |
| 5,072,880 | 12/1991 | McCloud | 273/85 |
| 5,129,737 | 7/1992 | Stenner | 384/428 X |
| 5,224,722 | 7/1993 | Kempf | 280/166 |
| 5,338,264 | 8/1994 | Kempf | 474/168 |

FOREIGN PATENT DOCUMENTS

| | | | |
|---|---|---|---|
| 13043 | 6/1978 | Japan | 384/192 |
| 137331 | 5/1994 | Japan | 384/428 |

OTHER PUBLICATIONS

Dodge/Reliance Electric, "Dodge Mounted Bearings Catalog," Catalog No. A–428–1, 98495M, 1984, pp. B4–28 and 29.
Solidur, "Engineered Plastics for Industry," Catalog No. CATA0040, 3rd Edition, 1991, pp. 108–112.

*Primary Examiner*—Thomas R. Hannon
*Attorney, Agent, or Firm*—Christensen, O'Connor, Johnson & Kindness PLLC

[57] ABSTRACT

A rotatable shaft (12) is supported by a split bearing mounted between the shaft and a fixed object (14). In a preferred embodiment, the split bearing includes a first bearing section (16a), an identical second bearing section (16b), and a removable retainer (18) for holding the bearing sections (16a, 16b) in place. Each bearing section has a concave inner surface (32a, 32b). The first bearing section (16a) and the second bearing section (16b) are fitted to the shaft so that the concave inner surface (32a) of the first bearing section (16a) and the concave inner surface (32b) of the second bearing section (16b) face the shaft. The retainer (18) is mounted on the shaft and includes an opening (40) for receiving and holding the bearing sections (16a,16b) adjacent to the shaft. Each bearing section (16a, 16b) is provided with a bushing (46a, 46b) that is received by bushing holes (42, 44) in the retainer (18). Cap screws (48, 49) extend through the bushings (46a, 46b) and bushing holes (42, 44) to secure the bearing to the fixed object (14). In an alternative embodiment, the elements of the first and second bearing sections (16a', 16b') correspond to elements of the first and second bearing sections (16a, 16b) in the first embodiment. However, in this embodiment, the retainer is omitted. The first and second bearing sections (16a', 16b') form an integral key (27) when joined so as to hold the bearing sections adjacent a shaft (12') and prevent the bearing sections (16a', 16b') from slipping relative to one another. The bearing sections (16a', 16b') are then mounted to a fixed object (14') by a pair of cap screws (48', 49'). Split bearings (60, 62, 64) formed in accordance with the present invention can be used in a wheelchair lift (51) that has a platform (50) for carrying a passenger, a carriage (54) that supports the platform (50), and a drive assembly (56) including a drive shaft (58) extending between opposite sides of the carriage (54) for moving the carriage (54) and platform(54), wherein the split bearings (60, 62, 64) are to support the drive shaft (58).

20 Claims, 5 Drawing Sheets

SPLIT BEARING

FIELD OF THE INVENTION

The present invention generally relates to a bearing used to support a shaft from a fixed object, and more specifically to a bearing capable of being replaced without removing the shaft from the fixed object.

BACKGROUND OF THE INVENTION

Bearings are commonly used to provide a low friction support for moving parts of a mechanical device. For example, a bearing typically is mounted between a rotatable shaft and a fixed object in order to support the shaft and reduce friction as the shaft rotates. The bearing must fit precisely so that the bearing both supports the shaft and allows it to rotate freely. Any deterioration of the bearing may interfere with rotation of the shaft, resulting in a malfunction of the mechanical device and/or serious injury to one operating or using the mechanical device. Accordingly, time consuming maintenance of bearings is frequently required.

Depending on the environment in which a bearing is installed, the bearing may deteriorate at an accelerated rate due to a wide variety of corrosive and damaging elements. This is particularly troublesome for mechanical devices used in harsh environments, where the bearing is exposed to extreme heat, cold, moisture and/or debris. In cases where a metal bearing is used, corrosion may prevent rotation of the shaft and make removal difficult. In addition, since a bearing typically is formed or molded as an integral unit, a damaged bearing can be removed and replaced only by removing the shaft from the remaining portion of the mechanical device, an inconvenient procedure requiring the expenditure of substantial time.

It is known to provide bearings having cooperating halves that may be separated so that the bearings may be removed without first removing the shaft from the device. However, these bearings (1) have relatively complex structures that render the bearings expensive to manufacture, and/or (2) are inconvenient to install and remove. For example, U.S. Pat. No. 5,072,821 to Kruse et al. describes a split bearing for use in an escalator. The bearing is formed in two halves, one of which is provided with four detents and a longitudinal projection, and the other of which is provided with four corresponding orifices and a longitudinal slot. The halves are snap-fit together by fitting the detents in the orifices and the projection in the slot. A bearing having this configuration is relatively costly to manufacture in view of the detents, orifices, projection, and slot that must be formed to close tolerances. Moreover, a user may have difficulty snapping and unsnapping the bearing halves, especially in confined environments. As another example, U.S. Pat. No. 5,072,880 to McCloud describes a bearing for supporting the central portion of a shaft extending through a wall opening. The bearing is formed in three sections: a female half and a male half comprising two identical semicylindrical pieces. The bearing is assembled by joining the two semicylindrical pieces to form the male half and inserting the male half into the wall opening. The female half is then inserted into the other side of the wall opening and mated to the male half. This construction is not suitable for use in applications where both sides of a bearing support are not easily accessed. Moreover, in situations in which there is limited space in which to work, it may be quite difficult to engage and disengage the male and female halves.

Finally, the bearings described above are not suited for use in particularly harsh environments. For example, such bearings would not be suited for wheelchair lifts of the type installed in the entryway of transit vehicles, such as passenger buses, due to the typically severe conditions under which the lifts are operated and serviced. Transit vehicles equipped with such lifts must often operate in harsh climates, with poor road conditions, and for long periods of time. Known bearings are particularly vulnerable to the damaging and corrosive elements typically experienced in the lift environment. When such a bearing eventually deteriorates, it cannot be replaced without substantial disassembly of the lift, a process which is time consuming and relatively difficult due to the limited space beneath a transit vehicle. Moreover, since the lift is used to carry wheelchair passengers or other passengers requiring assistance, safety is of paramount importance.

Accordingly, a split bearing having a simple construction, that is convenient to install and remove, and is relatively inexpensive to manufacture is needed. The split bearing must be capable of being removed and replaced without removal of a shaft from a fixed object and without requiring access to both sides of a bearing support. In addition, the split bearing must be of highly durable construction so that it reduces the risk of shaft malfunction.

SUMMARY OF THE INVENTION

The present invention provides a split bearing having a plurality of sections, each section having a concave inner surface for supporting a shaft from a fixed object. In a first preferred embodiment, the split bearing is formed in two identical sections. One section includes a first concave inner surface, and the other bearing section includes a second concave inner surface. The first bearing section and the second bearing section are positioned so that the first concave inner surface and the second concave inner surface closely receive the shaft to support it and allow it to rotate freely. A retainer, slidable along the shaft, is used to rigidly hold the first bearing section and the second bearing section in the shaft supporting position adjacent one side of the fixed object.

In the first preferred embodiment, the first bearing section has a first bearing plate section and a first bearing flange section, wherein the first bearing flange section protrudes from the first bearing plate section. Similarly, the second bearing section has a second bearing plate section and a second bearing flange section that protrudes therefrom. When installed on a shaft, the first bearing flange section and the second bearing flange section form a composite bearing flange which extends outwardly from the bearing plate sections and the side of the fixed object and parallel to the longitudinal axis of the shaft. The retainer, which is slidable along the shaft, includes a central opening sized to receive the bearing flange so that the retainer rigidly holds the first and second bearing sections adjacent to the shaft. The retainer also includes a pair of bushing holes, each receiving a bushing extending outwardly from a corresponding bearing plate section. The bearing sections and retainer are mounted to the same side of the fixed object by a pair of fasteners passing through the bushing holes of the retainer and the bushings of the bearing plate sections.

In an alternative embodiment of the present invention, the retainer is omitted and the bearing sections are placed in contact with one another and mounted to the fixed object by a pair of fasteners. The split bearing preferably is formed in two sections. The first bearing section includes a first concave inner surface and a first pair of contact surfaces, while the second bearing section includes a second concave surface and a second pair of contact surfaces. The first and second bearing sections are positioned so that the first pair of contact surfaces adjoin the second pair of contact surfaces and the first and second concave inner surfaces closely receive the shaft. In accordance with Further aspects of this invention, the first and second pairs of contact surfaces may be contoured so that the first and second pairs of contact surface, when joined, form an integral key that holds the first and second bearing sections adjacent the shaft and prevents the first and second bearing sections from slipping relative to one another.

The present invention provides a split bearing having a simple construction, requiring only two fasteners, e.g., cap screws, to hold the bearing assembly together. A split bearing in accordance with the present invention is inexpensive to manufacture and is easy to install and remove. The bearing sections are made from a low friction, corrosion resistant material such as plastic and do not require lubrication.

The split bearing of the present invention is particularly advantageous when used in a wheelchair lift of the type installed in the entry of transit vehicles. For example, one widely used type of wheelchair includes a platform for carrying a passenger, a carriage that supports the platform, and a drive assembly including a drive shaft extending between opposite sides of the carriage for moving the carriage and platform. The split bearing may be used to support the drive shaft extending between the opposite sides of the carriage. By virtue of its construction, the split bearing may be replaced without removing the drive shaft. Moreover, the split bearing is easy to install or remove from the drive shaft despite the limited access available in the lift environment.

INCORPORATION BY REFERENCE

Applicant incorporates by reference U.S. Pat. No. 4,058,228 to Hall for "Passenger Vehicle Access Stair and Elevator Apparatus"; U.S. Pat. No. 5,224,722 to Kempf for "Leaf Chain Drive Assembly"; and U.S. Pat. No. 5,338,264 to Kempf for "Compliant Sheave."

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
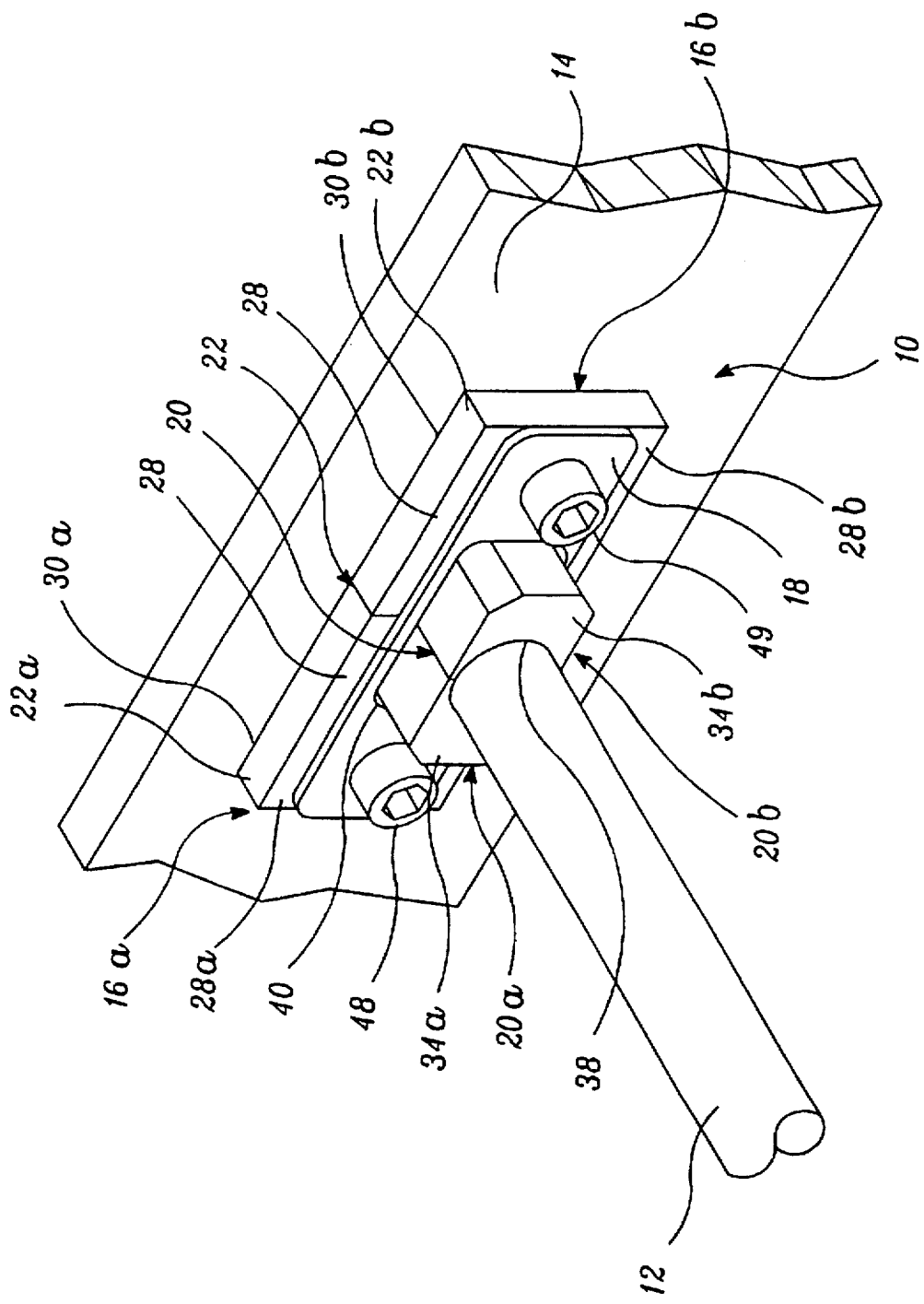
FIG. 1 is an isometric view of an assembled split bearing formed in accordance with a first embodiment of the present invention.

In the embodiment illustrated in FIG. 1, a split bearing 10 in accordance with the present invention is assembled around a rotatable shaft 12 and mounted on a fixed support 14. The split bearing 10 comprises a first bearing section 16a and an identical second bearing section 16b secured in this position by a retainer 18. The first and second bearing sections preferably are made of an ultra-high molecular weight plastic or similar low fiction and corrosion resistant material, which allows the shaft to rotate freely, eliminates the need for lubrication, and resists the corrosive elements to which the split bearing may be exposed. The bearing may be sectioned in different configurations, for example, in quarters or thirds. Also, the bearing may include only a single section. Moreover, the sections need not all be equally sized. Furthermore, the sections are not required to surround the entire circumference of the shaft. It is only necessary that the bearing sections be sufficient to support the shaft in the direction of the load. This may be, for example, as little as 90° to 120° , as compared to the 360° of the complete shaft circumference. Nevertheless, for ease in manufacture and assembly, and for the greatest flexibility, two identical halves each encompassing 180° of the shaft circumference are preferred.

Figure 2:
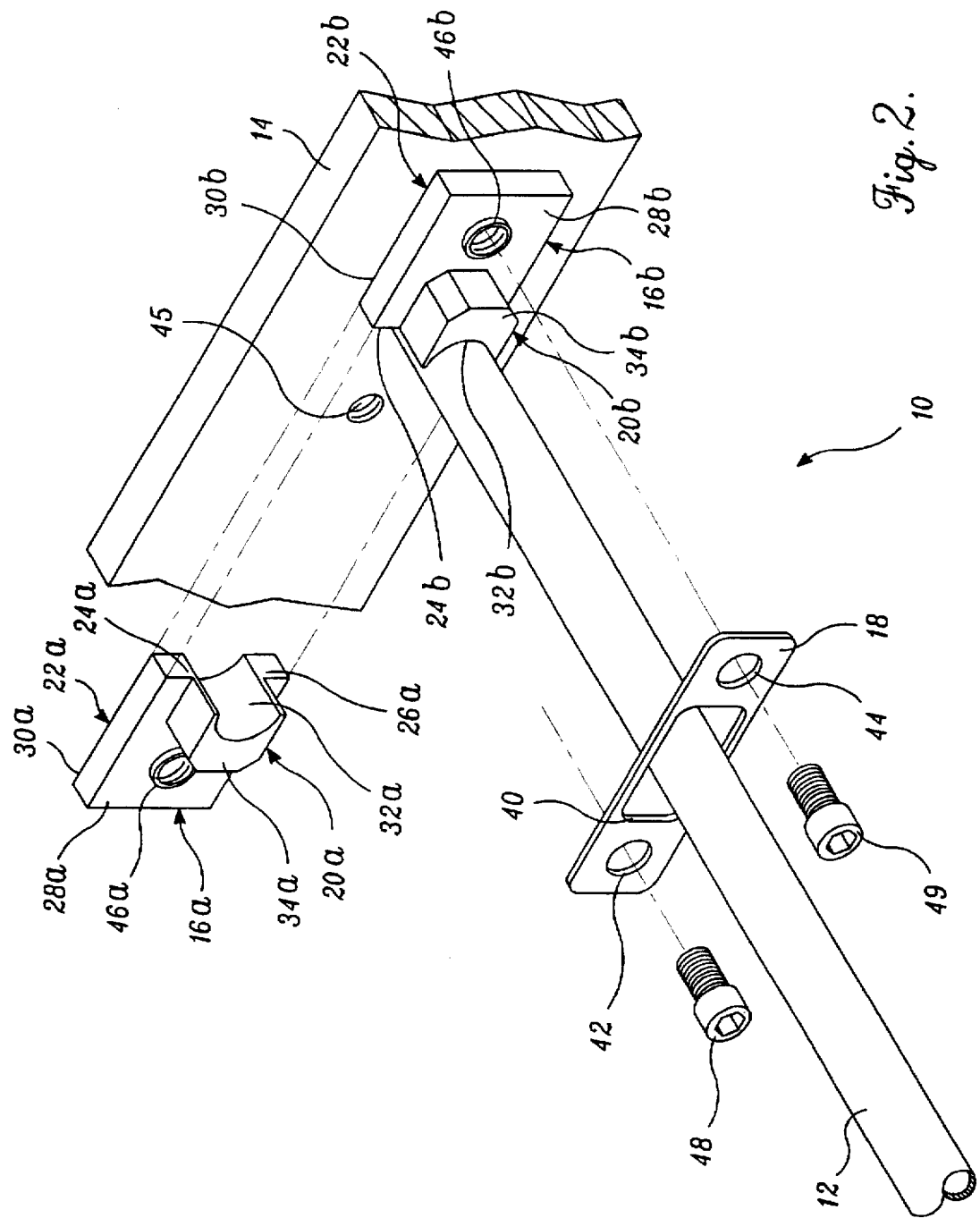
FIG. 2 is an isometric view of the split bearing of FIG. 1 partially disassembled.

FIG. 2 shows a partially disassembled split bearing 10. The first bearing section 16a is shown removed from the shaft 12. The bearing section 16a comprises a bearing plate section 22a, a bearing flange section 20a, and a pair of contact surfaces 24a and 26a. The bearing plate section 22a preferably is generally rectangular, but may be any shape, and includes a front surface 28a and a rear surface 30a. The bearing flange section 20a and the bearing plate section 22a are integrally formed so that the bearing flange section 20a protrudes from the front surface 28a of the bearing plate section 22a and forms a concave low friction inner surface 32a that extends from the rear surface 30a of the bearing plate section 22a to front surface 34a of the bearing flange section 20a. The first bearing section 16a also includes a bushing 46a that extends outwardly from the front surface of the bearing plate section 22a. Second bearing section 16b is identical to first bearing section 16a and corresponding elements have been numbered accordingly.

To assemble the split bearing 10 in the preferred embodiment, the two bearing sections 16a and 16b are positioned so that surfaces 24a and 26a abut surfaces 24b and 26b. The adjacent bearing sections 16a, 16b form a composite bearing plate 22 and bearing flange 20, wherein the bearing flange 20 extends outwardly from a front surface 28 of the bearing plate 22 parallel to the longitudinal axis of the shaft 12. Further, the concave inner surface 32a of the first bearing section 16a and the concave inner surface 32b of the second bearing section 16b are positioned so as to form a composite low friction surface 38 which supports the shaft. As noted above, it is preferred but not required for the inner surfaces 32a, 32b of the bearing sections to form a closed surface around the shaft. Nevertheless, it is necessary that the bearing sections provide a supporting surface centered to resist the force applied by the shaft. It also is preferable to limit the clearance between the bearing sections so as to reduce the possibility of foreign matter entering the bearing.

The bearing sections 16a, 16b are secured adjacent to the shaft by a retainer 18. The retainer 18 includes a central opening 40 shaped to receive the bearing flange 20 with a snug fit. Also, the retainer 18 has two mounting holes 42 and 14, one on each side of the central opening shaft. The retainer 18 is preferably made of a strong, rigid material such as galvanized steel. The opening 40 receives the bearing flange 20, which is sized and shaped so that the bearing flange 20 fits snugly and nonrotably within the opening 40 and the bearing sections 16a, 16b are held closely adjacent to the shaft. The bushing hole 42 accepts the projecting portion of the bushing 46a of the first bearing section 16a, while the bushing hole 44 accepts the projecting portion of the bushing 46b of the second bearing section 16b. Hence, the bushings 46a and 46b and the flange portions 20a and 20b serve as keys for the bearing sections 16a, 16b so that the bearing sections are stably positioned by the retainer 18.

The split bearing 10, including the two bearing sections 16a and 16b and the retainer 18, is mounted to the front surface of the fixed support 14 by a pair of cap screws 48, 49 or other suitable fastening means. The cap screw 48 extends through the hole 42 and the bushing 46a, and into a bore 45 of the fixed support 14. Similarly, the cap screw 49 passes through the bushing hole 44 and the bushing 46b, into another bore in the fixed support (not shown). The bushings 46a and 46b prevent the cap screws 48, 49 from crushing the bearing plate sections 22a and 22b. This configuration enables installation or removal of the bearing without requiring access to the rear side of the fixed support.

As can be seen in FIG. 2, the split bearing 10 may be easily disassembled by first removing the cap screws 48, 49 and then sliding the retainer 18 off the bearing bushings 46a and 46b and the flange 20 along the longitudinal axis of the shaft. Once the retainer 18 has been removed, the first and second bearing sections 16a, 16b may be removed from the shaft and the from surface of the fixed support by laterally separating the halves. In the preferred embodiment, the retainer 18 remains engaged with the shaft and cannot be removed unless the shaft is detached from the fixed support 14. However, the retainer may be formed in a split configuration if desired. Replacement of the retainer 18 is usually not necessary since the retainer 18 is made of steel or a similar strong, rigid, and durable material. Since only the relatively inexpensive, plastic bearing sections typically need to be replaced, the cost of bearing replacement is reduced. In addition, the time involved in replacing the split bearing is minimal.

Figure 3:
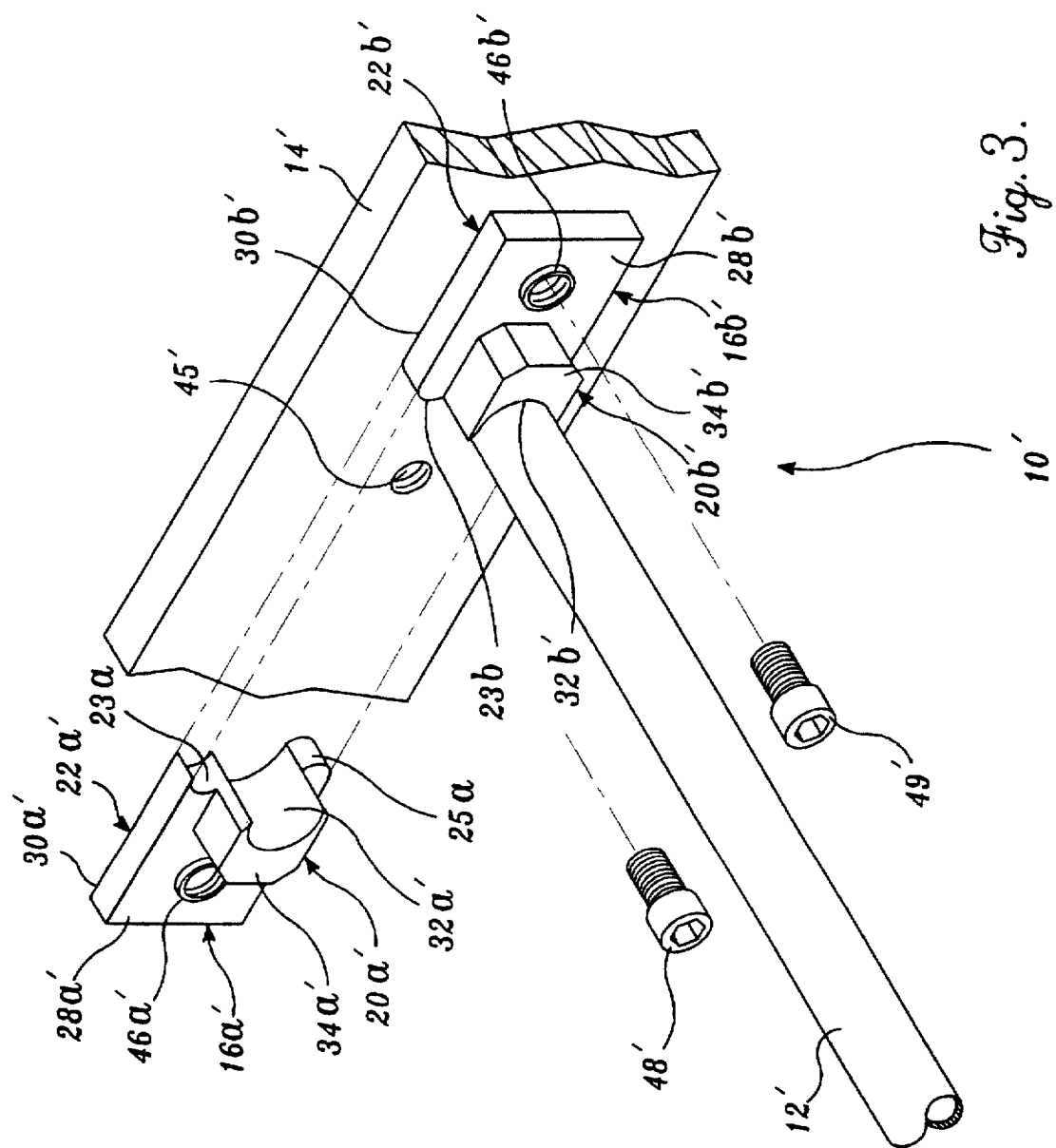
FIG. 3 is an isometric view of a split bearing formed in accordance with a second embodiment of the present invention, wherein the split bearing is partially disassembled.

FIG. 3 illustrates a second embodiment of the present invention. The split bearing 10' comprises a first bearing section 16a' and a second bearing section 16b' for supporting a shaft 12'. In this embodiment, the bearing sections are required to be placed in contact with one another so as to form a closed surface around the shaft. It should be understood the bearing may be sectioned in different configurations, for example, in quarters or thirds. Moreover, the sections need not be equally sized. However, for ease of manufacture and use, half-sections are preferred. In the drawings, elements of the first and second bearing sections 16a', 16b' corresponding to elements of the first and second bearing sections 16a, 16b in the first embodiment are designated with a prime ('). The bearing sections 16a', 16b' have complementary contoured contact surfaces that form an integral key when joined so as to prevent the bearing sections from slipping relative to one another, as discussed in detail below.

The first bearing section 16a' has a concave contact surface 23a at one side of the supporting surface 32a' and a convex contact surface 25a at the other side, while second bearing section 16b' has a convex contact surface 23b and a concave contact surface 25b. When the bearing sections are brought together, concave contact surface 23a of the first bearing section interlocks with convex contact surface 23b of the second bearing section, and convex contact surface 25a interlocks with concave contact surface 25b, forming the integral key 27 shown in FIG. 4. Thus, any shift in position or slipping of the bearing sections relative to the shaft 12' is prevented, and binding of the bearing sections relative to the shaft is reduced. Further, the integral key 27 holds the two bearing sections together such that the inner supporting surfaces 32a' and 32b' of the two bearing sections form a closed surface 38' around the shaft and provide a rigid structure supporting the shaft.

The first and second bearing sections 16a', 16b' are mounted to a fixed support 14' by cap screws 48' and 49', or other suitable fasteners, extending through bushings 46a' and 46b'. In this preferred embodiment, a retainer, such as retainer 18 of the first embodiment, is not required because the integral key assists in stably positioning the bearing sections relative to each other. The split bearing 10' may be easily disassembled and removed from the shaft 12' by simply removing the cap screws 48' and 49' and separating the two bearing sections.

It is not required that the contoured contact surfaces of each bearing section 16a', 16b' have a convex or concave contour. Rather, it is necessary only that the contours of the contact surfaces of the first bearing section be complementary to the contours of the contact surfaces of the second bearing section such that the contoured contact surface of one bearing section forms one or more projections that fit snugly within one or more complementary depressions formed by the contoured contact surface of the other bearing section. In addition, it is preferable that the contoured contact surfaces cooperate such that lateral movement of the bearing sections relative to one another is effectively prevented.

Figure 4:
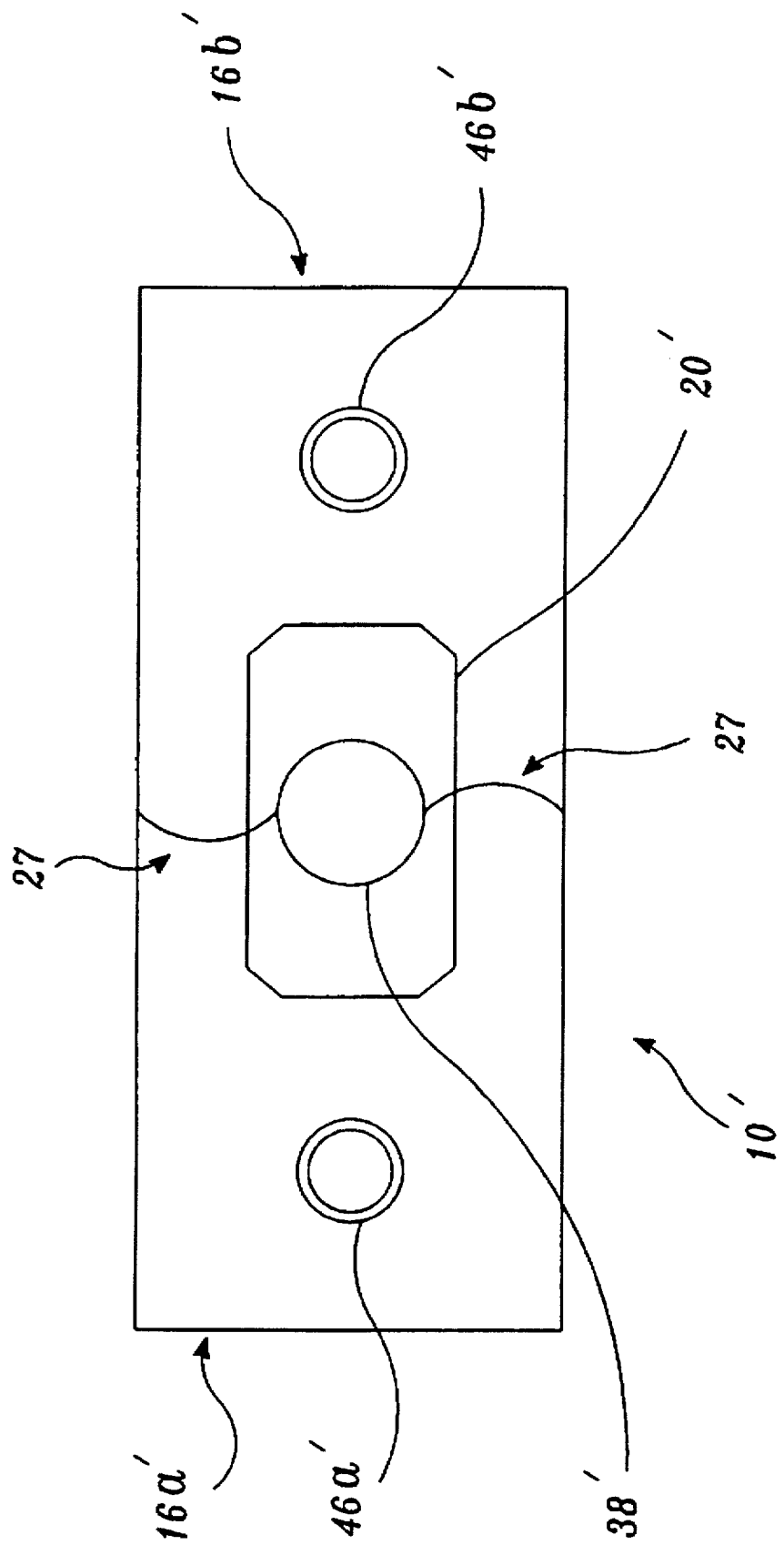
FIG. 4 is a front elevation view of the split bearing illustrated in FIG. 3 in assembled condition.

Each bearing section 16a' and 16b' may comprise only one contoured contact surface and a flat contact surface, as compared to a pair of contoured contact surfaces as depicted in FIGS. 3 and 4. For example, the contact surfaces of first bearing section 16a' may comprise a concave contact surface and a flat contact surface, while the contact surfaces of second bearing section 16b' may comprise a convex contact surface and a flat contact surface. When the bearing sections are brought together, the concave contact surface of the first bearing section would interlock with the convex contact surface of the second bearing section to form the integral key, while the flat contact surface of the first bearing section would abut the flat contact surface of the second bearing section. In yet other embodiments, both of the contact surfaces of each bearing section may be flat. When the bearing sections are brought together and mounted to a fixed support 14a', the flat contact surfaces could provide sufficient resistance to reduce binding and inhibit movement of the bearing sections if manufactured to close tolerances.

The present invention may be used in a wide variety of applications. It may be necessary only to change the shape and/or size of the various elements of the split bearing in order to accommodate a particular device and/or a particular environment. Consequently, it is possible to easily replace existing bearings with those of the present invention with a minimal expenditure of cost, effort, and time.

Figure 5:
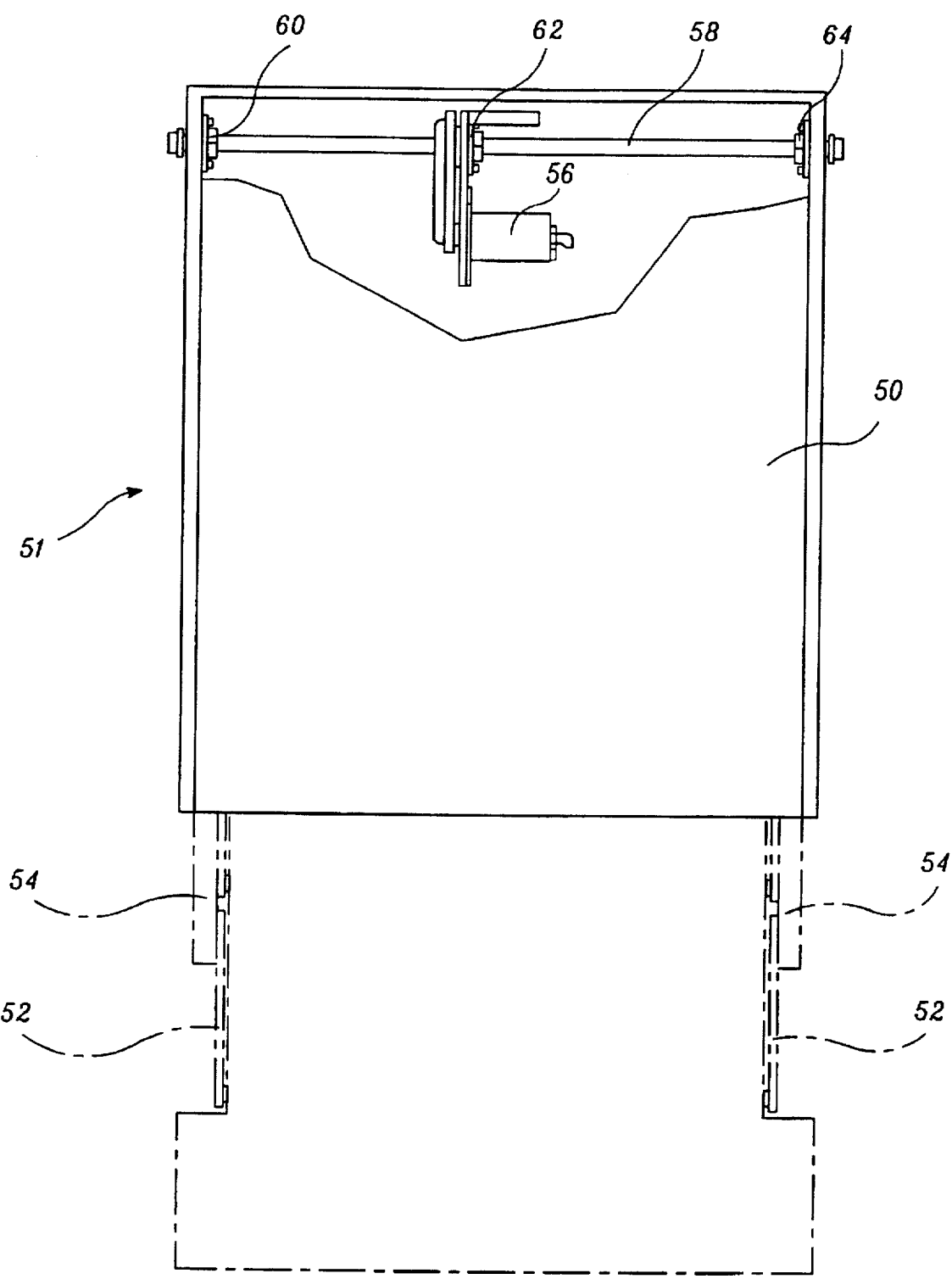
FIG. 5 is a top plan view of a platform of a wheelchair lift equipped with three split bearings formed in accordance with the present invention.

The inventors have found that the present invention is particularly advantageous when used in wheelchair lifts of the type installed in the entryway of transit vehicles, such as passenger buses. FIG. 5 is a top view of a platform of a typical wheelchair lift equipped with the present invention. An example of a wheelchair lift is illustrated in U.S. Pat. No. 4,058,228; U.S. Pat. No. 5,224,722; and U.S. Pat. No. 5,338,264, incorporated by reference herein. It will be appreciated, however, that the application of the present invention is not limited to this particular environment.

Referring now to FIG. 5, the wheelchair lift 51 is mounted in the entryway of a transit vehicle. The wheelchair lift 51 includes a platform 50 which is retracted at least partially beneath the vehicle deck when the lift 51 is stowed and which may be moved to an extended position (shown in phantom) to receive a passenger for transport between an upper position (the vehicle) and a lower position (the ground). More specifically, the platform 50 is attached via an arm assembly 52 to a carriage 54. A motorized drive assembly 56 causes the carriage 54 and platform 50 to move between the retracted and extended positions. The drive assembly 56 includes a drive shaft 58 which extends between opposite sides of the carriage 54. The drive shaft 58 is supported by three split bearings (50, 62, and 64 formed in accordance with the present invention, one near each end of the shaft 58 and one near the center. The fixed bearing supports may be formed in any conventional manner known to those skilled in the art as part of the flame of the lift.

The split bearing of the present invention is especially suited for use in wheelchair lifts due to the typically severe conditions under which the lifts are operated and serviced. Transit vehicles equipped with such lifts must often operate in harsh climates, with poor road conditions, and for long periods of time. Since the split bearing of the present invention is made of highly corrosion resistant and low friction material, the split bearing is less vulnerable to the damaging and corrosive elements typically experienced in the lift environment. If a split bearing eventually deteriorates, it is easily replaced without removing the drive shaft 58 from the carriage 54, a process which is time consuming and relatively difficult due to the limited space beneath a transit vehicle. Finally, since the lift is used to carry wheelchair passengers or other passengers requiring assistance, safety is of paramount importance. Since removal of the split bearing does not require disassembly of the lift, and the split bearing itself is of highly durable construction, the risk of lift malfunction is greatly reduced.

While a number of preferred embodiments of the invention have been illustrated and described, it will be appreciated that various changes can be made therein without departing from the spirit and scope of the invention. For example, as noted above, the bearing may be formed in more than two sections. Also, the bearing plate and beating flange may be formed in a variety of shapes. Moreover, in embodiments requiring use of a retainer, the bearing sections need not be located around the entire circumference of the shaft. Furthermore, the retainer may be provided with other than a single opening to receive the flange portions of the bearing sections. For example, the retainer may be provided with a separate opening for each bearing flange section.

The embodiments of the invention in which an exclusive property or privilege is claimed are defined as follows:

1. A bearing for supporting a shaft from a fixed object, comprising:
   (a) at least two bearing sections, each bearing section having:
      (i) a concave inner surface, the concave inner surface of the bearing section being adjacent the shaft when the bearing section is fit on the shaft adjacent one side of the fixed object;
      (ii) a bearing plate; and
      (iii) a bearing flange that protrudes outwardly from the beating plate; and
   (b) a retainer slidable along the shaft, the retainer being located on the same side of the fixed object as the beating section, and the retainer including at least one opening for receiving the beating section and holding the bearing section adjacent the shaft.

2. The bearing of claim 1, wherein when the bearing is fit on the shaft, the bearing sections in combination have an angular extent of close to 360° so as to surround substantially the entire circumference of the shaft.

3. The bearing of claim 1, wherein each bearing plate and corresponding bearing flange are integrally formed.

4. A split bearing for supporting a shaft from a fixed support, comprising:
   a first bearing section having a first concave inner surface, a first bearing plate section, and a first bearing flange section that protrudes outwardly from the first bearing plate section;
   a second beating section having a second concave inner surface, a second bearing plate section, and a second bearing flange section that protrudes outwardly from the second bearing plate section, the first and second concave inner surfaces being adjacent the shaft when the first and second bearing sections are fit on the shaft adjacent one side of the fixed support such that the first and second concave inner surfaces support the shaft and allow the shaft to rotate freely; and
   a removable retainer including at least one opening for receiving the first and second bearing sections and holding them adjacent the shaft, the retainer being located on the same side of the fixed object as the bearing sections.

5. The bearing of claim 4, wherein when the beating is fit on the shaft, the bearing sections in combination have an angular extent of close to 360° so as to surround substantially the entire circumference of the shaft.

6. The beating of claim 4, wherein the first beating plate section and the first bearing flange section are integrally formed so as to form the first concave inner surface, and wherein the second beating plate section and the second bearing flange section are integrally formed so as to form the second concave inner surface.

7. The bearing of claim 7, wherein when the first beating section and the second bearing section are positioned adjacent the shaft, the first beating flange section and the second beating flange section form a bearing flange which extends outwardly from the first and second bearing plate sections and the side of the fixed object along a longitudinal axis of the shaft.

8. The beating of claim 7, wherein the bearing flange fits snugly within the opening of the retainer so that the retainer holds the first and second bearing sections adjacent the shaft.

9. The bearing of claim 9, the first beating plate further comprising a first bushing protruding outwardly from the first beating plate; the second beating plate further comprising a second bushing protruding outwardly from the second bearing plate; and the retainer including a first bushing hole for receiving the first bushing and a second bushing hole for receiving the second bushing.

10. The bearing of claim 9, further comprising a first fastener and a second fastener for mounting the bearing sections and the retainer to a fixed object, wherein the first fastener extends through the first bushing hole and the first bushing, and the second fastener extends through the second bushing hole and the second bushing.

11. A split bearing for use in a wheelchair lift having a platform for carrying a passenger, a carriage that supports the platform, and a drive assembly including a drive shaft extending between opposite sides of the carriage for moving the cartage and platform, wherein the split bearing supports the drive shaft, the split bearing comprising:
   (a) first bearing section having a first concave inner surface and a first bushing;

(b) a second bearing section having a second concave inner surface and a second bushing, the first bearing section and the second bearing section forming a channel for receipt of the drive shaft when the bearing is fit on the drive shaft;

(c) a retainer slidable on the drive shaft, the retainer including:
  (i) an opening for receiving the first and second bearing sections and holding them adjacent the shaft;
  (ii) a first bushing hole for receiving the first bushing; and
  (iii) a second bushing hole for receiving the second bushing; and (d) a first fastener and a second fastener for mounting the first and second bearing sections and the retainer to a fixed object, wherein when the bearing is installed, the first fastener extends through the first bushing hole and the first bushing, and the second fastener extends through the second bushing hole and the second bushing.

12. A passenger lift designed for installation in the entryway of a passenger vehicle the lift comprising:

a platform for carrying a passenger;

a carriage that supports the platform, the carriage and platform being movable between an upper position and a lower position;

a drive assembly including a drive shaft extending between opposite sides of the carriage, the drive assembly being configured to move the carriage and platform inwardly and outwardly relative to the vehicle entryway, the drive shaft being supported by at least two split bearings, each split bearing comprising:

at least two bearing sections, each bearing section having;
  (i) a concave inner surface, the concave inner surface of the bearing section being adjacent the drive shaft when the bearing is fit on the shaft, and
  (ii) a bearing plate portion and a bearing flange portion that protrudes outwardly from the bearing plate portion, wherein the bearing flange portions form a bearing flange which extends outwardly from the bearing plate portions along a longitudinal axis of the shaft when the bearing sections are placed adjacent the shaft, and wherein the bearing is fit on the shaft, the bearing sections in combination have an angular extent of close to 360° so as to surround substantially the entire circumference of the shaft; and a retainer slidable along the shaft, the retainer including at least one opening for receiving the bearing section and holding the bearing section adjacent the drive shaft, and wherein the retainer includes at least one opening for receipt of the bearing flange portions.

13. The passenger lift of claim 12, wherein the bearing flange fits snugly within the opening of the retainer so that the retainer holds the bearing sections adjacent the shaft.

14. The passenger lift of claim 12, each bearing section further comprising a first bushing protruding outwardly from the bearing plate portion; the retainer including a plurality of bushing holes for receiving the bushing protruding outwardly from the bearing plate portions; and the bearing further comprising a plurality of fasteners for mounting the bearing sections and the retainer to a fixed object, wherein each fastener extends through a corresponding bushing hole and bushing.

15. A bearing for supporting a shaft from a fixed object, comprising:

at least two bearing sections fixedly attachable to the fixed object, each bearing section having a concave inner surface, the concave inner surface of the bearing section being adjacent the shaft when the bearing section is fit on the shaft adjacent one side of the fixed object and attached to the one side of the fixed object; and a retainer slidable along the shaft, the retainer being located on the same side of the fixed object as the bearing section, and the retainer including at least one opening for receiving the bearing section and holding the bearing section to one side of the fixed object.

16. The bearing of claim 15, each bearing section further comprising a bearing plate and a bearing flange that protrudes outwardly from the bearing plate.

17. A split bearing for supporting a shaft from a fixed support, comprising:

a first bearing section having a first concave inner surface;

a second bearing section having a second concave inner surface, the first and second concave inner surface being adjacent the shaft when the first and second bearing sections are fit on the shaft adjacent one side of the fixed support and are attached to the one side of the fixed support such that the first and second concave inner surfaces support the shaft and allow the shaft to rotate freely; and a removable retainer including at least one opening for receiving the first and second bearing sections and holding them adjacent the shaft, the retainer being located on the same side of the fixed object as the bearing sections.

18. The bearing of claim 17, the first bearing section further comprising (a) a first bearing plate section, and (b) a first bearing flange section that protrudes outwardly from the first bearing plate section; the second bearing section further comprising (a) a second bearing plate section, and (b) a second bearing flange section that protrudes outwardly from the second bearing plate section.

19. The bearing of claim 18, wherein the first bearing plate section and the first bearing flange section are integrally formed so as to form the first concave inner surface, and wherein the second bearing plate section and the second bearing flange section are integrally formed so as to form the second concave inner surface.

20. The bearing of claim 18, the first bearing plate further comprising a first bushing protruding outwardly from the first bearing plate; the second bearing plate further comprising a second bushing protruding outwardly from the second bearing plate; and the retainer including a first bushing hole for receiving the first bushing and a second bushing hole for receiving the second bushing.

* * * * *

UNITED STATES PATENT AND TRADEMARK OFFICE
CERTIFICATE OF CORRECTION

PATENT NO. : 5,678,932
DATED : October 21, 1997
INVENTOR(S) : A.R. Cohn

It is certified that error appears in the above-identified patent and that said Letters Patent is hereby corrected as shown below:

| COLUMN | LINE | |
|---|---|---|
| 7 (Claim 1, | 62 line 11) | "beating" should read --bearing-- |
| 7 (Claim 1, | 65 line 14) | "beating" should read --bearing-- |
| 7 (Claim 1, | 66 line 15) | "beating" should read --bearing-- |
| 8 (Claim 4, | 13 line 7) | "beating" should read --bearing-- |
| 8 (Claim 5, | 27 line 1) | "beating" should read --bearing-- |
| 8 (Claim 6, | 31 line 1) | "beating" (both occurrences) should read --bearing-- |
| 8 (Claim 6, | 34 line 4) | "beating" should read --bearing-- |
| 8 (Claim 7, | 37 line 1) | "of claim 7," should read --of claim 4,-- |
| 8 (Claim 7, | 37 line 1) | "beating" should read --bearing-- |

UNITED STATES PATENT AND TRADEMARK OFFICE
CERTIFICATE OF CORRECTION

PATENT NO. : 5,678,932
DATED : October 21, 1997
INVENTOR(S) : A.R. Cohn

It is certified that error appears in the above-identified patent and that said Letters Patent is hereby corrected as shown below:

| COLUMN | LINE | |
|---|---|---|
| 8 (Claim 7, | 39 line 3) | "beating" should read --bearing-- |
| 8 (Claim 7, | 40 line 4) | "beating" should read --bearing-- |
| 8 (Claim 8, | 44 line 1) | "beating" should read --bearing-- |
| 8 (Claim 9, | 47 line 1) | "of claim 9," should read --of claim 7,-- |
| 8 (Claim 9, | 47 line 1) | "beating" should read --bearing-- |
| 8 (Claim 9, | 49 line 3) | "beating" (both occurrences) should read --bearing-- |
| 8 (Claim 11, | 64 line 5) | "cartage" should read --carriage-- |
| 9 (Claim 12, | 23 line 2) | After "vehicle" insert --,-- |
| 9 (Claim 12, | 34 line 13) | After "having" delete ";" and insert therefor --:-- |

UNITED STATES PATENT AND TRADEMARK OFFICE
CERTIFICATE OF CORRECTION

PATENT NO. : 5,678,932
DATED : October 21, 1997
INVENTOR(S) : A.R. Cohn

It is certified that error appears in the above-identified patent and that said Letters Patent is hereby corrected as shown below:

| COLUMN | LINE | |
|---|---|---|
| 9 (Claim 14, | 59 line 4) | "the bushing" should read --the bushings-- |
| 10 (Claim 15, | 18 line 13) | "section to" should read --sections to-- |
| 10 (Claim 17, | 26 line 5) | "surface" (second occurrence) should read --surfaces-- |

Signed and Sealed this

Ninth Day of June, 1998

Attest:

BRUCE LEHMAN

*Attesting Officer*        *Commissioner of Patents and Trademarks*